US011919427B2

(12) United States Patent
Vetere, II et al.

(10) Patent No.: US 11,919,427 B2
(45) Date of Patent: Mar. 5, 2024

(54) SECONDARY STABILIZATION STRIKER FOR REVERSIBLE SEATS

(71) Applicants: Magna Seating Inc, Aurora (CA); Louis Vetere, Commerce Township, MI (US); Michael D Nacy, Lake Orion, MI (US); Kai Zhao, Rochester Hills, MI (US); Detjon Marini, White Lake, MI (US); Cheikh Dioum, Farmington Hills, MI (US)

(72) Inventors: Louis Vetere, II, Commerce Township, MI (US); Michael D Nacy, Lake Orion, MI (US); Kai Zhao, Rochester Hills, MI (US); Detjon Marini, White Lake, MI (US); Cheikh Dioum, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 734 days.

(21) Appl. No.: 16/981,341

(22) PCT Filed: Mar. 18, 2019

(86) PCT No.: PCT/US2019/022679
§ 371 (c)(1),
(2) Date: Sep. 16, 2020

(87) PCT Pub. No.: WO2019/178585
PCT Pub. Date: Sep. 19, 2019

(65) Prior Publication Data
US 2021/0009015 A1   Jan. 14, 2021

Related U.S. Application Data

(60) Provisional application No. 62/643,780, filed on Mar. 16, 2018.

(51) Int. Cl.
*B60N 2/30*   (2006.01)
(52) U.S. Cl.
CPC ................. *B60N 2/3031* (2013.01)
(58) Field of Classification Search
CPC ........ B60N 2/00; B60N 2/0292; B60N 2/143; B60N 2/203; B60N 2/22; B60N 2/2245;
(Continued)

(56) References Cited

U.S. PATENT DOCUMENTS

| 784,426 | A | * | 3/1905 | Pickles | ............. | B61D 33/0028 |
| | | | | | | 297/97 |
| 795,596 | A | * | 7/1905 | Passett | .................... | A47C 7/48 |
| | | | | | | 297/97 |

(Continued)

FOREIGN PATENT DOCUMENTS

| FR | 2697215 A1 * | 4/1994 | ............. B60N 2/203 |
| JP | 6039289 B2 * | 12/2016 | ............... B60N 2/20 |
| WO | 2007056850 | 11/2006 | |

OTHER PUBLICATIONS

Asada, "Reversible seat of car", Published: Apr. 29, 1994, Publisher: French Patent Office, Edition: FR2697215A1 (Year: 1994).*

(Continued)

*Primary Examiner* — Amy R Weisberg
*Assistant Examiner* — Joyce Eileen Hill
(74) *Attorney, Agent, or Firm* — Miller Canfield

(57) ABSTRACT

A reversible seat assembly for use in an automotive vehicle has an inboard seat riser, an outboard seat riser, a seat cushion, a seat back, a plurality of inboard reversing links, a plurality of outboard reversing links, a plurality of inboard strikers coupled to the inboard seat riser and a plurality of outboard strikers coupled to the outboard seat riser. The seat cushion is coupled to the inboard and outboard seat risers, and extends between a front end and a rear end. The seat (Continued)

back comprises an inboard latch bracket and an outboard latch bracket. The plurality of inboard reversing links extend between an upper end pivotally coupled to the inboard latch bracket and a lower end pivotally coupled to the inboard seat riser, and the plurality of outboard reversing links extend between an upper end pivotally coupled to the outboard latch bracket and a lower end pivotally coupled to the outboard seat riser. When the seat back is adjacent the rear end of the seat cushion, the inboard latch bracket engages the plurality of inboard strikers and the outboard latch bracket engages the plurality of outboard strikers.

6 Claims, 3 Drawing Sheets

(58) Field of Classification Search
CPC ...... B60N 2/32; B60N 2/1896; B60N 2/1839; B60N 2205/30; B61D 33/00; B61D 33/0028
USPC ............. 296/65.01, 65.09; 297/94, 101, 103, 297/283.3, 344.1, 344.21, 95
See application file for complete search history.

(56) References Cited

U.S. PATENT DOCUMENTS

| | | | |
|---|---|---|---|
| 1,140,342 A | | 5/1915 | Anger |
| 1,169,728 A | | 1/1916 | Lang |
| 1,298,823 A | | 4/1919 | Taylor |
| 1,488,459 A | * | 3/1924 | Biggs ..................... G09B 17/04 |
| | | | 434/227 |
| 1,576,746 A | | 3/1926 | Hansen |
| 1,968,434 A | | 7/1934 | Bell |
| 4,655,503 A | * | 4/1987 | Kamijo ................ B60N 2/3084 |
| | | | 297/238 |
| 6,715,825 B2 | | 4/2004 | Tame |
| 7,644,982 B2 | | 1/2010 | Paluch |
| 9,994,129 B1 | | 6/2018 | Shirokane |
| 2003/0047974 A1 | | 3/2003 | Tame |
| 2018/0105078 A1 | * | 4/2018 | Murray .............. B60N 2/01583 |

OTHER PUBLICATIONS

Kazunori Shima, "Vehicle Seat Lock", Published: Dec. 7, 2016, Publisher Japanese Patent Office, Edition: JP6039289B2 (Year: 2016).*

* cited by examiner

SECONDARY STABILIZATION STRIKER FOR REVERSIBLE SEATS

CROSS-REFERENCE TO RELATED APPLICATIONS

This application claims priority to U.S. provisional patent application No. 62/643,780, filed Mar. 16, 2018, which is incorporated herein by reference.

TECHNICAL FIELD

Example embodiments relate to a reversible seat assembly for an automotive vehicle.

BACKGROUND

Reversible seat assemblies for use in automotive vehicles are well known in the art. For example, U.S. Pat. Nos. 6,715,825 and 7,644,982, which are incorporated herein by reference, disclose seat assemblies that allow a user to position the seat back between a forward-facing position and a rearward-facing position. The seat assembly in U.S. Pat. No. 7,644,982 includes a pair of links 94, 96 for positioning the seat back 14 between a forward-facing position A and a rearward-facing position B. The seat assembly also includes a cushion control mechanism consisting of a pair of forward 200 and rearward 202 linkages for automatically controlling the seat cushion incline angle in response to movement of the seat back.

During forward loading conditions on the seat back, the seat back latch 110 and latch bracket 86 have a tendency to rotate on the striker 54. This rotation causes buckling and large compressive loads on the reversing links 94, 96. In order to offset the compressive loads and prevent buckling, more material would have to be used to strengthen the reversing links 94, 96, which adds additional expense and weight to the seat assemblies.

SUMMARY

This present invention alleviates the problem of the large compressive loads on the reversing links without requiring bulkier, more expensive reversing links by adding an additional striker that prevents the seat back latch and latch bracket from rotating about the primary striker. The additional striker is less bulky and less expensive to manufacture and use, and it is equally or more effective in preventing compressive loads and/or buckling.

According to one embodiment, there is provided a reversible seat assembly for use in an automotive vehicle comprising an inboard seat riser, an outboard seat riser, a seat cushion, a seat back, a plurality of inboard reversing links, a plurality of outboard reversing links, a plurality of inboard strikers coupled to the inboard seat riser and a plurality of outboard strikers coupled to the outboard seat riser. The seat cushion is coupled to the inboard and outboard seat risers, and extends between a front end and a rear end. The seat back comprises an inboard latch bracket and an outboard latch bracket. The plurality of inboard reversing links extend between an upper end pivotally coupled to the inboard latch bracket and a lower end pivotally coupled to the inboard seat riser, and the plurality of outboard reversing links extend between an upper end pivotally coupled to the outboard latch bracket and a lower end pivotally coupled to the outboard seat riser. When the seat back is adjacent the rear end of the seat cushion, the inboard latch bracket engages the plurality of inboard strikers and the outboard latch bracket engages the plurality of outboard strikers.

According to another embodiment, there is provided a reversible seat assembly for use in an automotive vehicle comprising a seat riser, a seat cushion, a seat back, a plurality of reversing links and a plurality of strikers coupled to the seat riser. The seat cushion is coupled to the seat riser and extends between a front end and a rear end. The seat back comprises a latch bracket. The plurality of reversing links extend between an upper end pivotally coupled to the latch bracket and a lower end pivotally coupled to the seat riser. When the seat back is adjacent the rear end of the seat cushion, the latch bracket engages the plurality of strikers.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1:
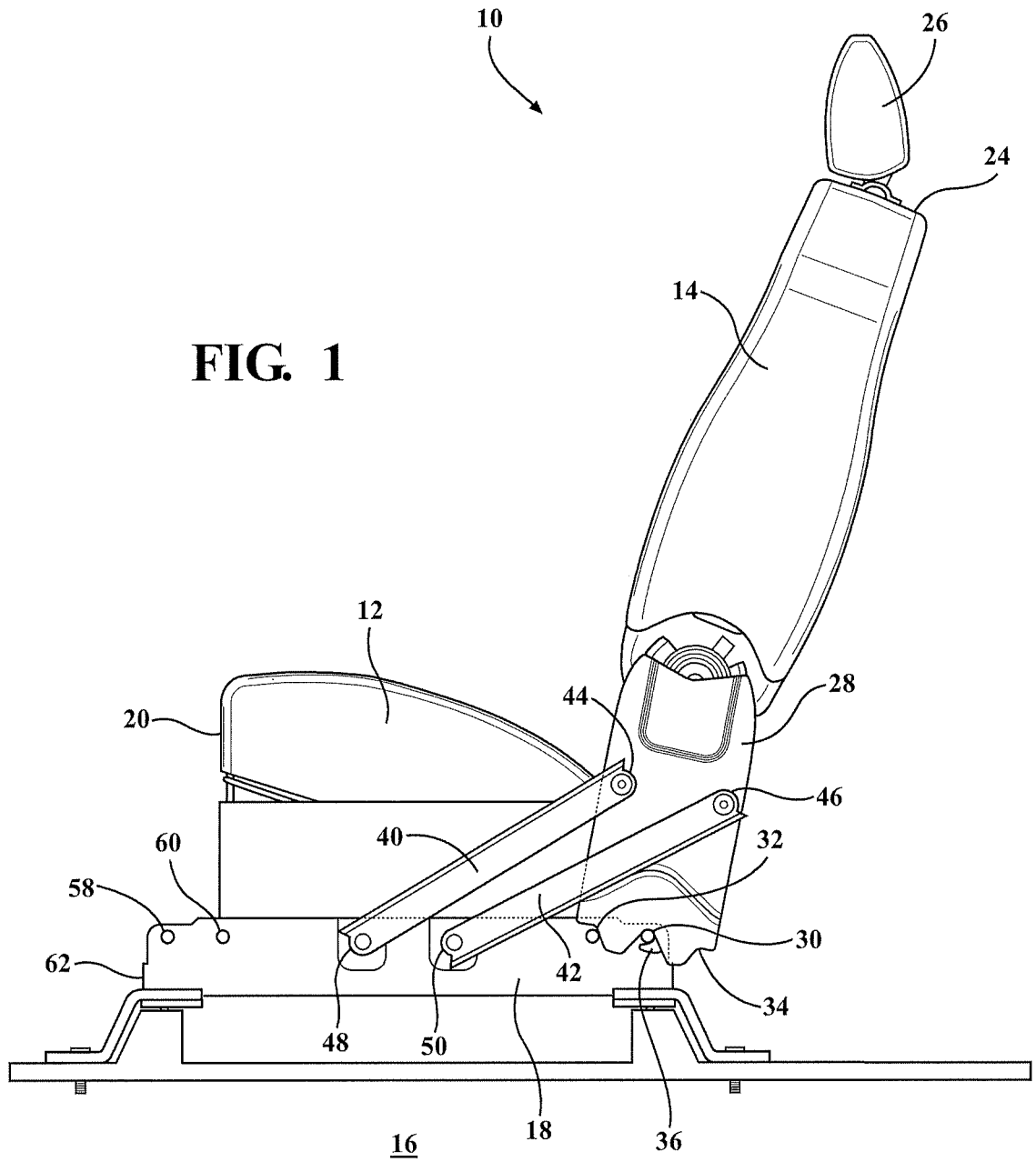
FIG. 1 is a fragmentary side view of the reversible seat assembly in the forward-facing seating position in accordance with one embodiment of the present disclosure.
Figure 2:
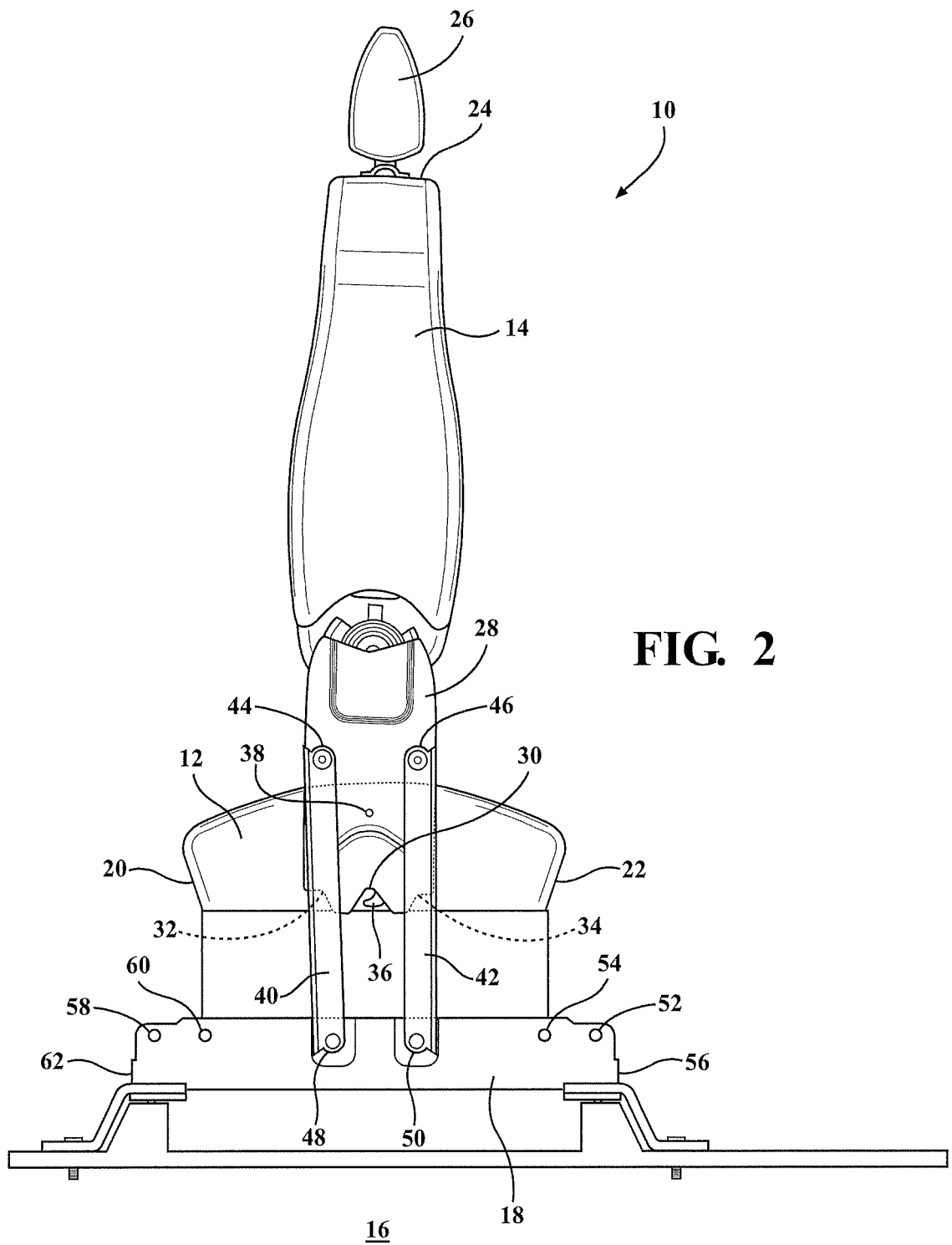
FIG. 2 is a fragmentary side view of the reversible seat assembly of FIG. 1 in a neutral position.
Figure 3:
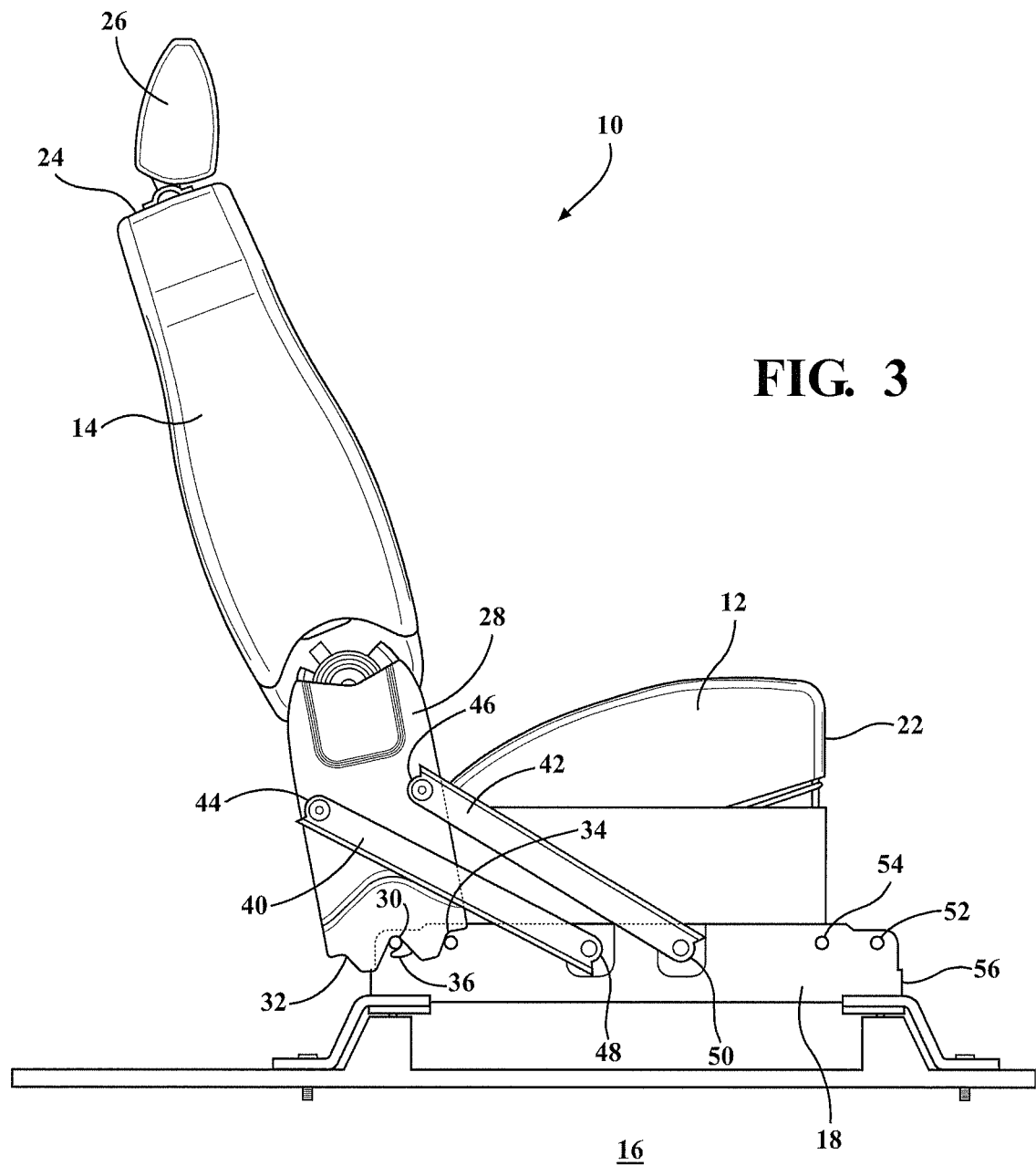
FIG. 3 is a fragmentary side view of the reversible seat assembly of FIG. 1 in the rearward-facing seating position.

FIGS. 1-3 illustrate one embodiment of a reversible seat assembly 10 for use in an automotive vehicle. The seat assembly 10 includes a seat cushion 12 and a seat back 14 operatively coupled to the seat cushion 12 for supporting a seat occupant in a generally upright seating position. The seat cushion 12 is supported above a floor 16 in the vehicle by an outboard seat riser 18 and an inboard seat riser (not shown). Although the Figures and description below refer to the outboard side of the seat assembly 10, the present invention includes corresponding structures on the inboard side, of the seat assembly, as is well known in the art.

The seat cushion 12 includes a front end 20 and an opposite rear end 22. The seat back 14 includes an upper end 24 for supporting a head restraint 26. The seat back 14 also includes an outboard latch bracket 28 and an inboard latch bracket (not shown). The latch bracket 28 includes a primary notch 30 and two secondary notches 32, 34. A seat back latch 36 is pivotally connected to the latch bracket 28 at pivot point 38. Outboard reversing links 40, 42 extend between an upper end 44, 46 pivotally coupled to the outboard latch bracket 28, and a lower end 48, 50 pivotally coupled to the outboard seat riser 18. A primary striker 52 and a secondary striker 54 are coupled to the outboard seat riser 18 toward the rear end 56 of the outboard seat riser 18, and a primary striker 58 and a secondary striker 60 are coupled to the outboard seat riser 18 toward the front end 62 of the outboard seat riser 18. Strikers 52, 54, 58, 60 are preferably welded to the outboard seat riser 18. However, it will be appreciated that other methods may be used to couple the strikers to the outboard seat riser, as is well known in the art.

FIGS. 1-3 illustrate the reversible seat assembly 10 of the present disclosure in a plurality of seating positions. In FIG. 1, the seat assembly 10 is illustrated in a forward-facing seating position. Forward-facing is defined as the seat cushion 12 and seat back 14 positioned to support the seat occupant in a direction facing toward the front of the vehicle, as is commonly known. In the forward-facing seating position, the seat back 14 is in a first generally upright position with the lower end of the seat back 14 adjacent the rear end 22 of the seat cushion 12. In this position, the primary notch 30 of the outboard latch bracket 28 engages the primary striker 52 at the rear end 56 of the outboard seat riser 18. Additionally, the seat cushion 12 is in a first inclined position such that the front end 20 is spaced father from the vehicle floor 16 than the rear end 22.

During forward loading conditions on the seat back 14, the outboard latch bracket 28 rotates forward and the secondary notch 32 of the outboard latch bracket 28 contacts the secondary striker 54 at the rear end 56 of the outboard seat riser 18. The secondary striker 54 supports the outboard latch bracket 28 and prevents excessive seat back rotation, which reduces the load on the reversing links 40, 42 during high load events and prevents them from buckling.

In FIG. 2, the seat assembly 10 is illustrated in a neutral position between the forward-facing and the rearward-facing seating positions.

In FIG. 3, the seat assembly 10 is illustrated in a rearward-facing seating position. Rearward-facing is defined as the seat cushion 12 and seat back 14 positioned to support the seat occupant in a direction facing toward the rear of the vehicle. In the rearward-facing seating position, the seat back 14 is in a second generally upright position with the lower end of the seat back 14 adjacent the front end 20 of the seat cushion 12. In this position, the primary notch 30 of the outboard latch bracket 28 engages the primary striker 58 at the front end 62 of the outboard seat riser 18. Additionally, the seat cushion 12 is in a second inclined position such that the rear end 22 is spaced farther from the vehicle floor 16 than the front end 20.

During rearward loading conditions on the seat back 14, the outboard latch bracket 28 rotates rearward and the secondary notch 34 of the outboard latch bracket 28 contacts the secondary striker 60 at the front end 62 of the outboard seat riser 18. The secondary striker 60 supports the outboard latch bracket 28 and prevents excessive seat back rotation, which reduces the load on the reversing links 40, 42 during high load events and prevents them from buckling.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A reversible seat assembly for use in an automotive vehicle comprising:
   a seat riser;
   a seat cushion coupled to the seat riser wherein the seat cushion extends between a front end and a rear end;
   a seat back comprising a latch bracket;
   a plurality of reversing links extending between an upper end pivotally coupled to the latch bracket and a lower end pivotally coupled to the seat riser;
   a plurality of strikers comprising a primary striker and a secondary striker coupled to the seat riser toward a rear end of the seat riser; and
   a second plurality of strikers comprising a second primary striker and a second secondary striker coupled to the seat riser toward a front end of the seat riser, wherein when the seat back is adjacent the rear end of the seat cushion, the latch bracket engages the primary striker and the secondary striker and wherein when the seat back is adjacent the front end of the seat cushion, the latch bracket engages the second primary striker and the second secondary striker.

2. The reversible seat assembly of claim 1 wherein the latch bracket includes a primary notch to engage one of the plurality of strikers.

3. The reversible seat assembly of claim 2 wherein the latch bracket includes a secondary notch to engage another of the plurality of strikers.

4. The reversible seat assembly of claim 1 wherein the seat cushion is operatively coupled to the seat riser for movement between a first inclined position wherein the front end is spaced further from the floor than the rear end and a second inclined position wherein the rear end is spaced farther from the floor than the front end.

5. The reversible seat assembly of claim 4 wherein the seat cushion is in the first inclined position when the seat back is adjacent the rear end of the seat cushion.

6. The reversible seat assembly of claim 5 wherein the seat cushion is in the second inclined position when the seat back is adjacent the front end of the seat cushion.

\* \* \* \* \*